(12) United States Patent
Kikuchi

(10) Patent No.: US 7,566,084 B2
(45) Date of Patent: Jul. 28, 2009

(54) LID OPENING-CLOSING MECHANISM OF CONTAINER DEVICE FOR VEHICLE

(75) Inventor: Masami Kikuchi, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 355 days.

(21) Appl. No.: 11/505,287

(22) Filed: Aug. 17, 2006

(65) Prior Publication Data

US 2007/0045332 A1 Mar. 1, 2007

(30) Foreign Application Priority Data

Aug. 25, 2005 (JP) ............................. 2005-244274

(51) Int. Cl.
*B60R 7/04* (2006.01)
*F16D 63/00* (2006.01)

(52) U.S. Cl. ..................... 296/37.8; 224/282; 224/311; 49/260; 188/83

(58) Field of Classification Search ................ 296/37.8, 296/37.12, 37.13, 37.1, 37.7, 37.9, 37.11; 224/282, 311; 49/260; 16/337; 188/83
See application file for complete search history.

(56) References Cited

U.S. PATENT DOCUMENTS

| | | | | |
|---|---|---|---|---|
| 5,620,122 A * | 4/1997 | Tanaka | ........................ | 224/275 |
| 5,713,623 A * | 2/1998 | Mattingly | .................. | 296/37.7 |
| 5,775,761 A * | 7/1998 | Asami et al. | ................ | 296/37.7 |
| 6,062,623 A * | 5/2000 | Lemmen | .................... | 296/37.8 |
| 6,276,737 B1 * | 8/2001 | Cansfield et al. | ........... | 296/37.8 |
| 6,470,627 B2 * | 10/2002 | Fukuo | .......................... | 49/260 |
| 6,715,727 B2 * | 4/2004 | Sambonmatsu | .......... | 248/311.2 |
| 6,799,705 B1 * | 10/2004 | Lutoslawski | ................. | 224/483 |
| 6,820,921 B2 * | 11/2004 | Uleski | ......................... | 296/152 |
| 6,932,402 B2 * | 8/2005 | Niwa et al. | ............... | 296/24.34 |
| 7,025,225 B2 * | 4/2006 | Inari | .......................... | 220/830 |
| 7,188,871 B2 * | 3/2007 | Nemoto et al. | .............. | 292/170 |
| 7,192,072 B2 * | 3/2007 | Schmidt et al. | .......... | 296/37.12 |

FOREIGN PATENT DOCUMENTS

JP 2002-331875 A 11/2002

* cited by examiner

*Primary Examiner*—Glenn Dayoan
*Assistant Examiner*—Gregory Blankenship
(74) *Attorney, Agent, or Firm*—Foley & Lardner LLP

(57) ABSTRACT

A lid opening-closing mechanism of a container device for a vehicle, including: a container device body provided in a vehicle interior of a vehicle; a lid attached freely openable and closable to the container device body; an elastic member interposed and provided between the container device body and the lid configured to bias the lid in an opening direction and a closing direction of the lid with biasing force; and a bidirectional damper attached to the container device body configured to attenuate the biasing force of the elastic member with attenuating force, wherein the elastic member includes a reversal spring in which biasing directions of the biasing force are reversible based on a reversal point in which one of the biasing directions is in the closing direction of the lid in a closed side of the lid of the reversal point and in which the other of the biasing directions is in the opening direction of the lid in an open side of the lid of the reversal point, and wherein the bidirectional damper includes a free-running section in which the attenuating force of the bidirectional damper is not generated in an early stage of at least one of the opening and closing of the lid.

2 Claims, 9 Drawing Sheets

LID OPENING-CLOSING MECHANISM OF CONTAINER DEVICE FOR VEHICLE

BACKGROUND

The present invention relates to a mechanism for opening and closing of a lid applied to a container device for a vehicle.

In a vehicle such as an automobile, a vehicle interior is provided with various container devices for the vehicle. Such a container device for the vehicle generally has a container device body and a lid (lid body) attached freely openable and closable to the container device body. In addition, there has been also known the container device having an elastic member which is provided between the container device body and the lid and which biases the lid toward a direction to which the lid opens, and a damper which attenuates the biasing force of the elastic member.

The container device having the elastic member and the damper is possible to automatically open the lid by the action that the biasing force of the elastic member applied to the lid, and is further possible to open the lid at a most appropriate opening speed by attenuating the biasing force of the elastic member with the damper.

On the other hand, there is a problem that operational feeling of an operator is not so good when closing the lid in the container device having the elastic member and the damper, since the biasing force of the elastic member becomes a load to the operator throughout an entire range of closing of the lid when the operator closes the lid. In addition, there are many cases in which an inexpensive bidirectional damper is used for the damper, rather than a unidirectional damper which is high in cost. Accordingly, the attenuating force of the bidirectional damper also becomes the load to the operator throughout the entire range of closing of the lid in addition to the biasing force of the elastic member, thereby causing the operational feeling of the operator even worse.

Given this factor, there has been developed a container device for the vehicle wherein an free-running section, in which the attenuating force of the bidirectional damper is not generated, is set in an early stage of opening and closing of the lid, as disclosed in JP2002-331875A for reference. When the free-running section of the damper is set in the early stage of opening and closing of the lid, the load in the early stage of closing of the lid is only the biasing force of the elastic member. Thereby, operational force required to operate the lid is partially lowered by the fact that the load is only the biasing force of the elastic member, and hence, it is possible to improve the operational feeling of the operator, partially.

However, there is a drawback in JP2002-331875A that an opening speed of the lid becomes too fast when the lid opens since the biasing force of the elastic member cannot be attenuated in the early stage of opening of the lid due to the setting of the free-running section, and thus an opening speed of the lid attractive to the operator cannot be attained. In addition, the biasing force of the elastic member and the attenuating force of the bidirectional damper both act as the load in a later stage of the closing of the lid to the end. Hence, there is also a drawback in JP2002-331875A that the operational feeling of the operator at the time when the closing of the lid is finished is bad.

SUMMARY

At least one objective of the present invention is to provide a lid opening-closing mechanism of a container device for a vehicle capable of exerting biasing force of an elastic member and attenuating force of a bidirectional damper in a balanced manner, such that operational feeling of an operator is improved.

To achieve these and other advantages and in accordance with the purpose of the invention, as embodied and broadly described herein, the invention provides a lid opening-closing mechanism of a container device for a vehicle, comprising: a container device body provided in a vehicle interior of the vehicle; a lid attached freely openable and closable to the container device body; an elastic member interposed and provided between the container device body and the lid configured to bias the lid in an opening direction and a closing direction of the lid with biasing force; and a bidirectional damper attached to the container device body configured to attenuate the biasing force of the elastic member with attenuating force, wherein the elastic member includes a reversal spring in which biasing directions of the biasing force are reversible based on a reversal point in which one of the biasing directions is in the closing direction of the lid in a closed side of the lid of the reversal point and in which the other of the biasing directions is in the opening direction of the lid in an opened side of the lid of the reversal point, and wherein the bidirectional damper includes a free-running section in which the attenuating force of the bidirectional damper is not generated in an early stage of at least one of the opening and closing of the lid.

In accordance with an embodiment of the invention, the reversal point of the elastic member is set substantially in a middle of the opening and closing of the lid, and wherein the reversal point of the elastic member and at least one of ends of the free-running section of the bidirectional damper are made to substantially coincide with each other.

In accordance with an embodiment of the invention, the reversal point of the elastic member is set in a position nearer to the closed side of the lid than a middle of the opening and closing of the lid, and wherein an end of the free-running section in the opened side of the lid is set substantially in a position same as the position of the reversal point or is set nearer to the opened side of the lid than the position of the reversal point.

In accordance with an embodiment of the invention, the lid is supported to an open-close central shaft through an arm such that the lid is upwardly opened and downwardly closed around the open-close central shaft.

In accordance with an embodiment of the invention, one end of the elastic member is attached to a movement point set in the arm and the other end of the elastic member is attached to a fixed point set in the container device body.

In accordance with an embodiment of the invention, the elastic member exerts its function as the reversal spring by adapting the movement point to pass a line connecting the open-close central shaft and the fixed point of the elastic member.

In accordance with an embodiment of the invention, the reversal point is set by an intersection point between a line, connecting the open-close central shaft and the fixed point of the elastic member, and a trajectory of passing of the movement point.

In accordance with an embodiment of the invention, the lid opening-closing mechanism further comprises a sector gear mounted to the open-close central shaft and engaged with an input gear attached to an input shaft of the bidirectional damper, wherein the free-running section is set by adapting the sector gear to rotate together with the lid through a play.

In accordance with an embodiment of the invention, the lid opening-closing mechanism further comprises: a sector gear mounted to the open-close central shaft and engaged with an input gear attached to an input shaft of the bidirectional damper; a notch provided to a shaft hole, through which the open-close central shaft is inserted and supported, of the arm; and an engagement protrusion provided to the sector gear which is slightly smaller than the notch, wherein the engagement protrusion is loosely fitted in the notch such that an angular difference between the notch and the engagement protrusion is provided as the free-running section.

Therefore, according to the lid opening-closing mechanism of the container device for the vehicle of the invention, for example, when the lid is to be opened from the closed state of the lid, an operator lifts the lid up with operational force in the opening direction against the biasing force in the closing direction of the elastic member until the movement point of the arm reaches the reversal point. Accordingly, the biasing direction of the biasing force of the elastic member is reversed from the closing direction to the opening direction when the movement point of the arm has proceeded beyond the reversal point. After the movement point of the arm has gone beyond the reversal point, the lid automatically opens by the biasing force of the elastic member in the opening direction. Thereby, the operational force in the opening direction throughout an entire range of opening of the lid is unnecessary. Hence, it is possible to improve the operational feeling of the operator.

In addition, because the free-running section, in which the attenuating force of the bidirectional damper is not generated, is set in the early stage of the opening of the lid, it is possible to lift up the lid easily with the reduced operational force of the operator in the opening direction. Also, it is possible to attenuate the biasing force of the elastic member with the bidirectional damper, in a damper effective section provided after elapsing of the free-running section in the opening of the lid.

On the other hand, when the lid is to be closed from the opened state of the lid, the operator presses the lid down with the operational force in the closing direction against the biasing force in the opening direction of the elastic member, until the movement point of the arm reaches the reversal point. Accordingly, the biasing direction of the biasing force of the elastic member is reversed from the opening direction to the closing direction when the movement point of the arm has proceeded beyond the reversal point. After the movement point of the arm has gone beyond the reversal point, the lid automatically closes by the biasing force of the elastic member in the closing direction. Thereby, the operational force in the closing direction throughout an entire range of closing of the lid is unnecessary, and hence, it is possible to improve the operational feeling of the operator.

In addition, because the free-running section in which the attenuating force of the bidirectional damper is not generated is set in the early stage of the closing of the lid, it is possible to press down the lid easily with the reduced operational force of the operator in the closing direction. Also, it is possible to attenuate the biasing force of the elastic member with the bidirectional damper, in the damper effective section provided after elapsing of the free-running section in the opening of the lid.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Reference will now be made in detail to the present preferred embodiments of a lid opening-closing mechanism of a container device for a vehicle of the invention, examples of which are illustrated in the accompanying drawings. The scope of the present invention, however, is not limited to these embodiments. Within the scope of the present invention, any structure and material described below can be appropriately modified.

According to the present preferred embodiment of the invention, the above-mentioned at least one objective of the invention, which is to provide a lid opening-closing mechanism of a container device for a vehicle possible to exert biasing force of an elastic member and attenuating force of a bidirectional damper in a balanced manner such that operational feeling of an operator is improved, is accomplished by providing a reversal spring in which biasing directions are reversible on the basis of a reversal point where the biasing direction is in a closing direction of a lid in a closed side of the lid of the reversal point and where the biasing direction is in an opening direction of the lid in an opened side of the lid of the reversal point, and setting a free-running section, in which the attenuating force of the bidirectional damper is not generated in an early stage of opening and closing of the lid, to the bidirectional damper.

FIGS. 1 to 11 show the lid opening-closing mechanism of the container device for the vehicle according to the preferred embodiment of the invention.

Figure 1:
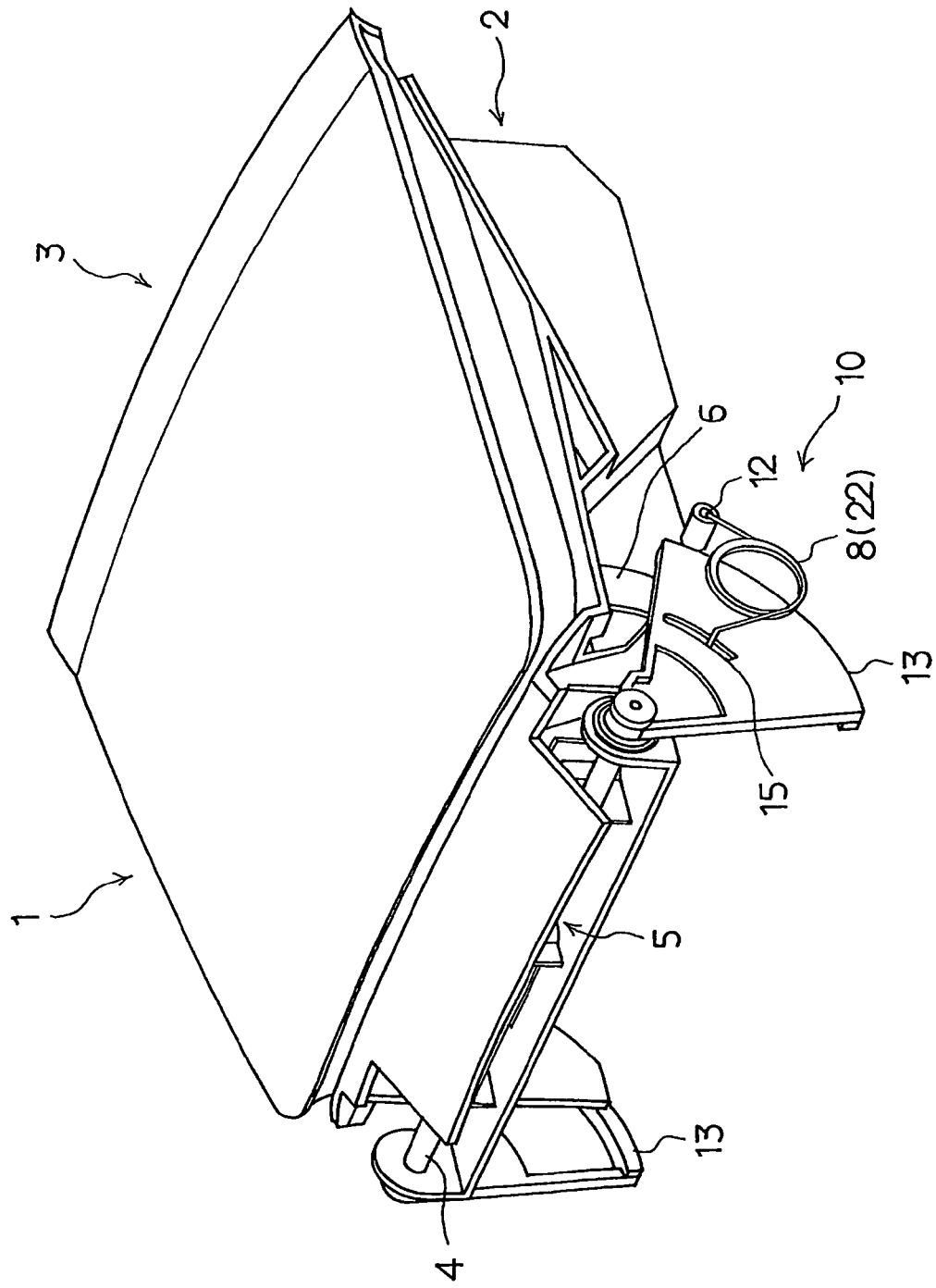
FIG. 1 is a perspective view showing a closed state of a lid of a lid opening-closing mechanism according to an embodiment of the present invention.
Figure 2:
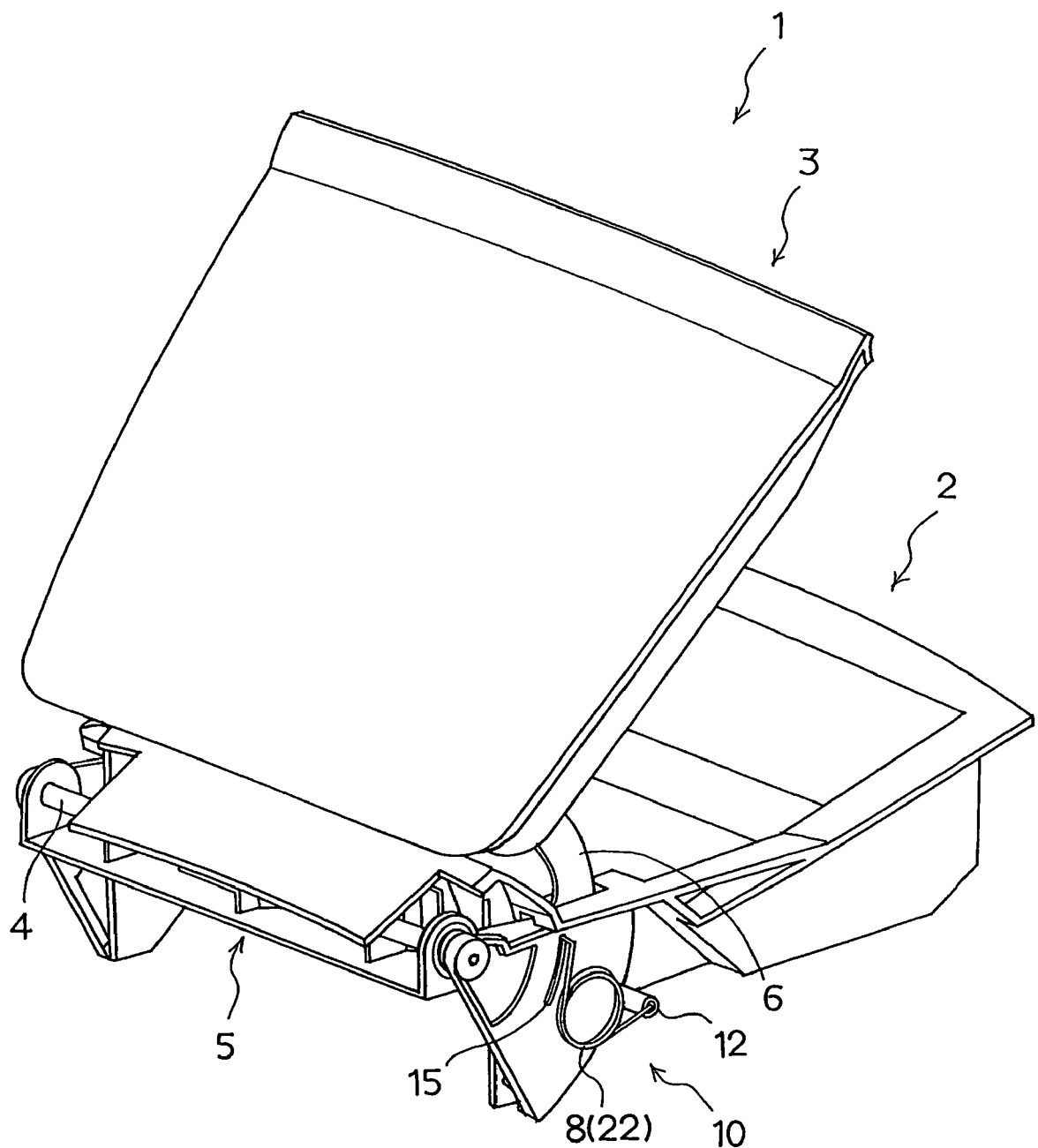
FIG. 2 is a perspective view showing an opened state of the lid shown in FIG. 1.
Figure 3:
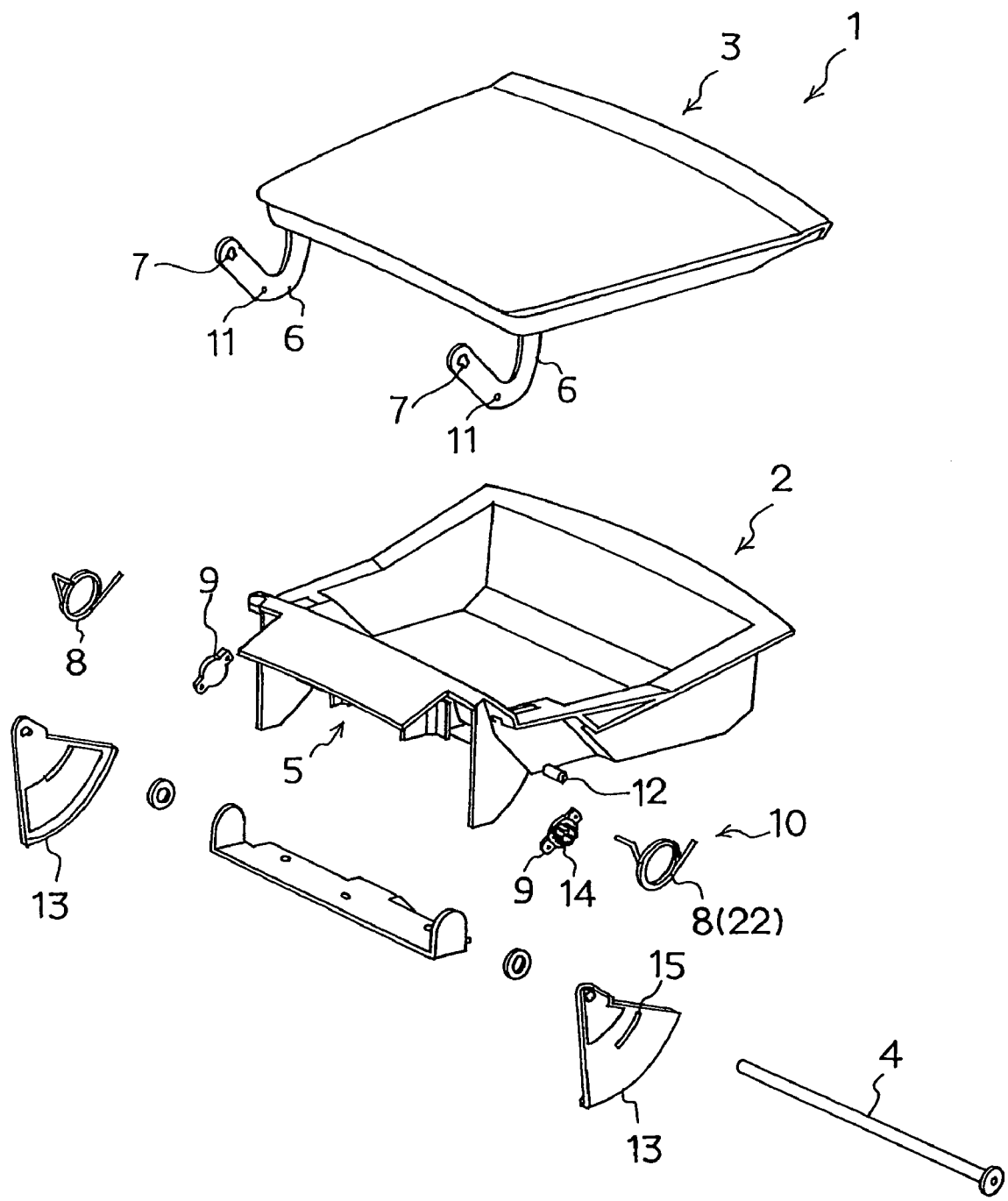
FIG. 3 is an exploded perspective view of FIG. 1.

Referring to FIGS. 1 to 3, there is provided a vehicle container device 1 capable of being mounted in a vehicle interior of the vehicle such as an automobile. Examples of the container device 1 are a storage device, an ashtray device, a cup holder device and so on, although it is not limited thereto.

The container device 1 employs a structure in which a lid (lid body) 3. is attached freely openable and closable to a container device body 2. The lid 3 is mounted to the container device body 2 through an open-close central shaft 4. More specifically, according to the present preferred embodiment of the invention, the lid 3 is supported to the open-close central shaft 4 such that the lid 3 is possible to upwardly opened and downwardly closed around the open-close central shaft 4.

The open-close central shaft 4 is supported by a shaft bearing 5 provided in a back part of the container device body 2 as seen from a side of an operator or an occupant, in such a manner as to be horizontally arranged substantially in a width direction of the container device body 2. Also, the open-close central shaft 4 is inserted into and supported by each shaft hole 7 of each arm 6 attached to the lid 3 in the back part of the container device body 2.

Each elastic member 8 for biasing the lid 3 in an opening direction and a closing direction of the lid 3 is interposed and mounted between the container device body 2 and the lid 3. Also, a bidirectional damper 9 for attenuating biasing force of the elastic member 8 is provided in both sides of the container device body 2. In the present preferred embodiment of the invention, the elastic member 8 and the bidirectional damper 9 structure a lid opening and closing mechanism 10.

According to the present preferred embodiment, for example, a torsion spring or other suitable spring is used for the elastic member 8. In a case of the preferred embodiment in which the torsion spring for example is used for the elastic member 8, one end of the elastic member 8 is attached to a movement point 11 set in the arm 6, whereas the other end of the elastic member 8 is attached to a fixed point 12 set in the container device body 2. The movement point 11 here can be a hole formed in the arm 6, and the fixed point 12 can be a boss which is attached to the container device body 2 and which protrudes in the width direction of the container device body 2, for example.

In the present preferred embodiment, a viscous damper or the like can be used for the bidirectional damper 9. The bidirectional damper 9 can be attached to the container device body 2. In addition, each sector gear 13, formed in a fan-like configuration for example, is mounted to the open-close central shaft 4, and each of the sector gears 13 is engaged with an input gear 14 attached to an input shaft of the bidirectional damper 9. The sector gear 13 is formed with a slit 15, formed in a circular arc-like configuration for example, in order to pass the above-described one end of the elastic member 8 therethrough and to prevent the sector gear 13 from interfering with the above-described one end of the elastic member 8 when the lid 3 is opened or closed.

Figure 4:
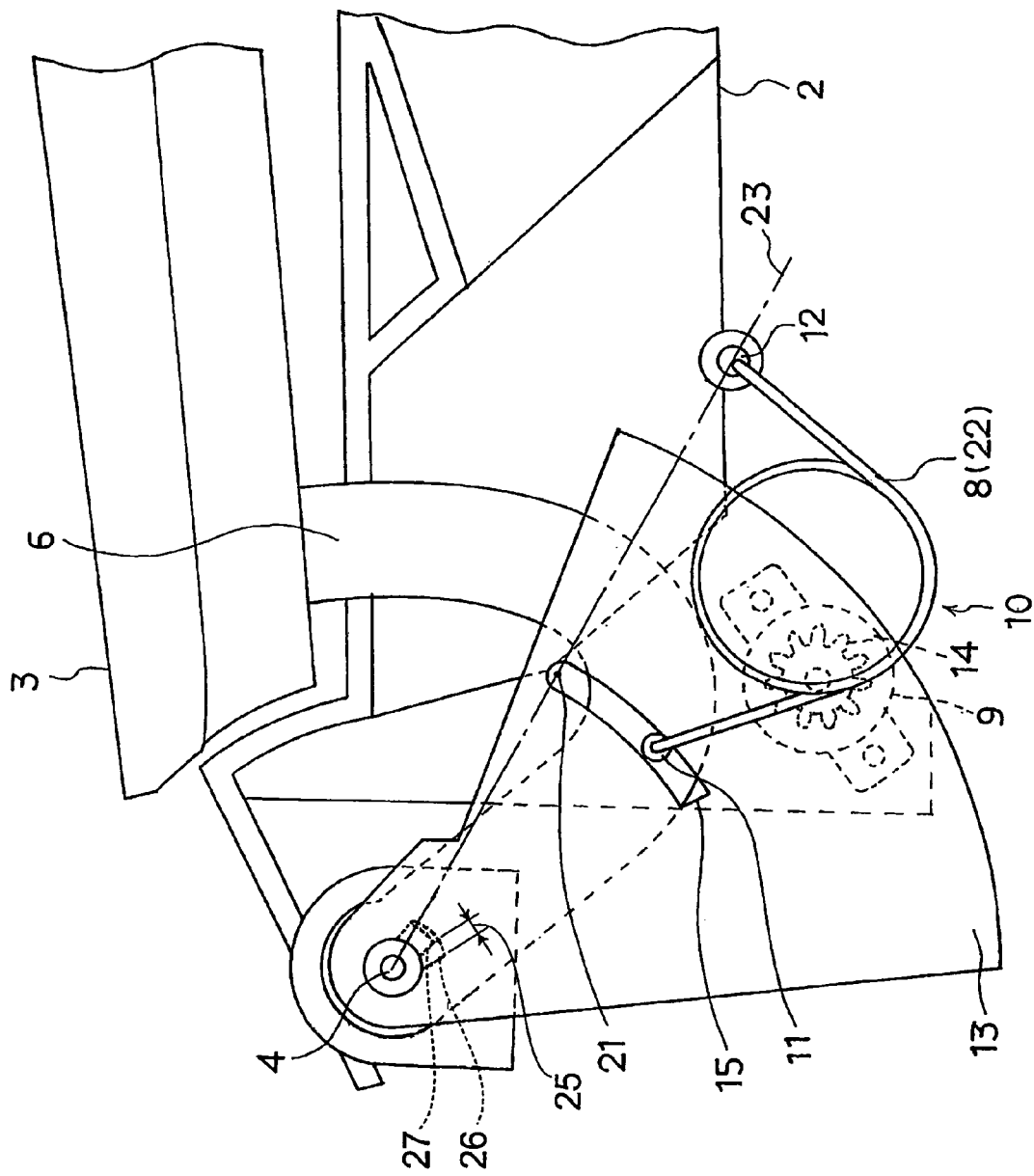
FIG. 4 is a side view showing the closed state of the lid of the lid opening-closing mechanism shown in FIG. 1.
Figure 5:
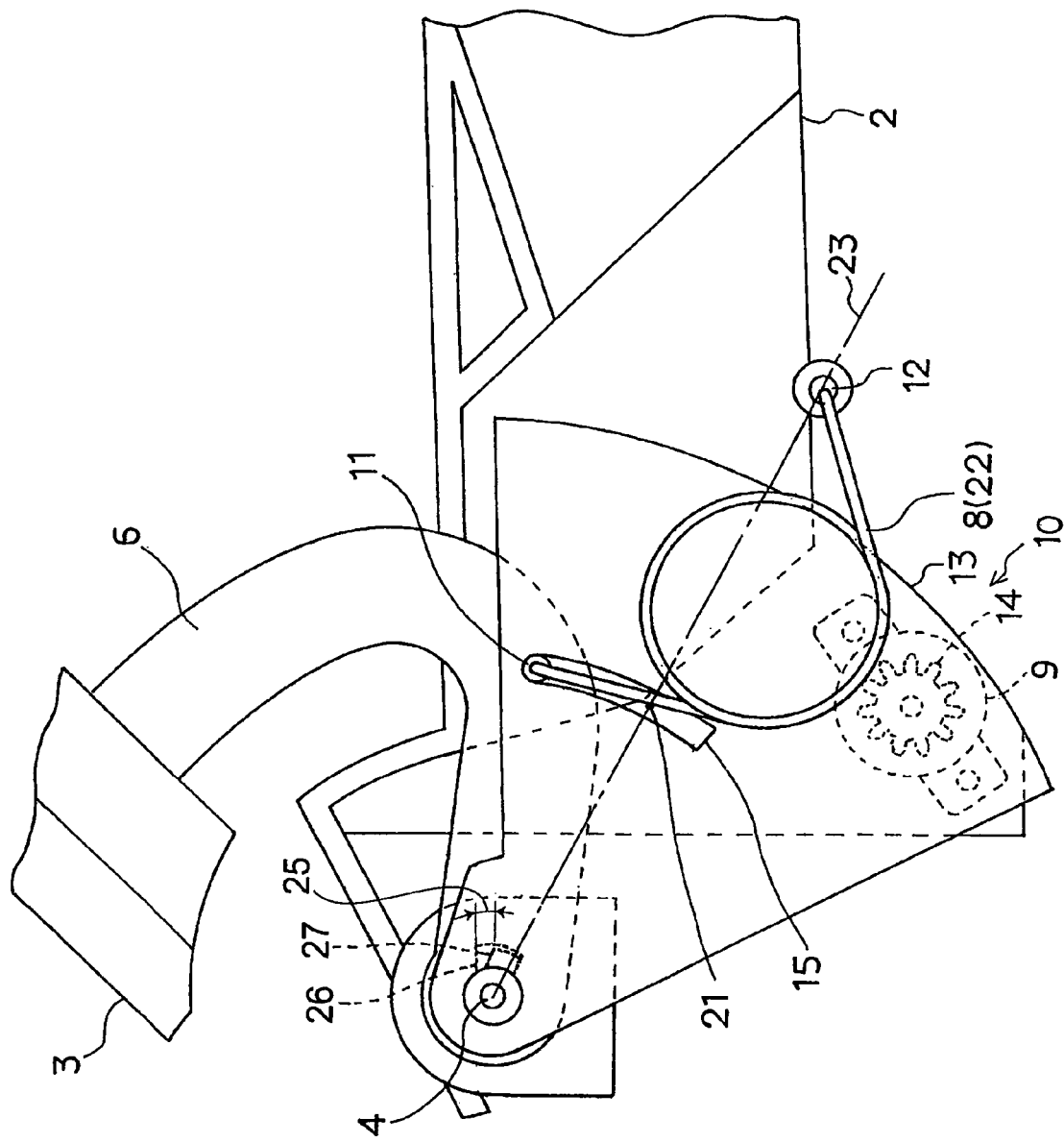
FIG. 5 is a side view showing the opened state of the lid of the lid opening-closing mechanism shown in FIG. 1

Referring to FIGS. 4 and 5, according to the present preferred embodiment of the invention, the elastic member 8 can be a reversal spring 22 in which biasing directions are reversible on the basis of a reversal point 21 where the biasing direction is in the closing direction of the lid 3 in a closed side of the lid 3 of the reversal point and where the biasing direction is in the opening direction of the lid in an opened side of the lid 3 of the reversal point 21. For example, the elastic member 8 exerts its function as the reversal spring 22 by adapting the movement point 11 to pass a line 23 connecting the open-close central shaft 4 and the fixed point 12 of the elastic member 8. The reversal point 21 according to the present preferred embodiment is an intersection point between the line 23 and a trajectory of passing of the movement point 11.

In addition, a free-running section 25, in which attenuating force of the bidirectional damper 9 is not generated in an early stage of opening and closing of the lid 3, is set to the bidirectional damper 9. For example, it is possible to set the effectual free-running section 25 by adapting the sector gear 13 to rotate together with the lid 3 through a required play. In the present preferred embodiment, for example, a required notch 26 is provided to the shaft hole 7 of the arm 6, and an engagement protrusion 27 which is slightly smaller than the notch 26 is formed on the sector gear 13, to loosely fit the engagement protrusion 27 in the notch 26. An angular difference (or an amount of play) in directions of rotation between the notch 26 and the engagement protrusion 27 thereby provided can be the free-running section 25.

Figure 6:
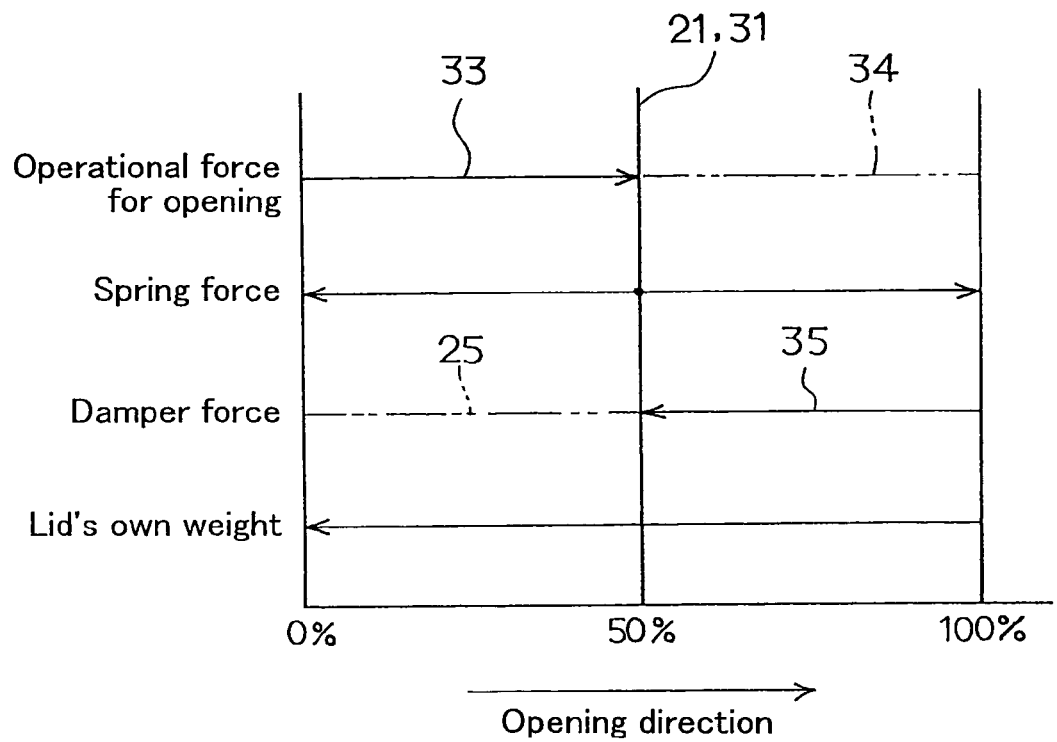
FIG. 6 is a diagram showing a relation of force at the time of opening of the lid in a case in which a reversal point of an elastic member is set substantially in the middle of opening and closing of the lid, and in which the reversal point and an end of a free-running section of a bidirectional damper are made to substantially coincide with each other.
Figure 7:
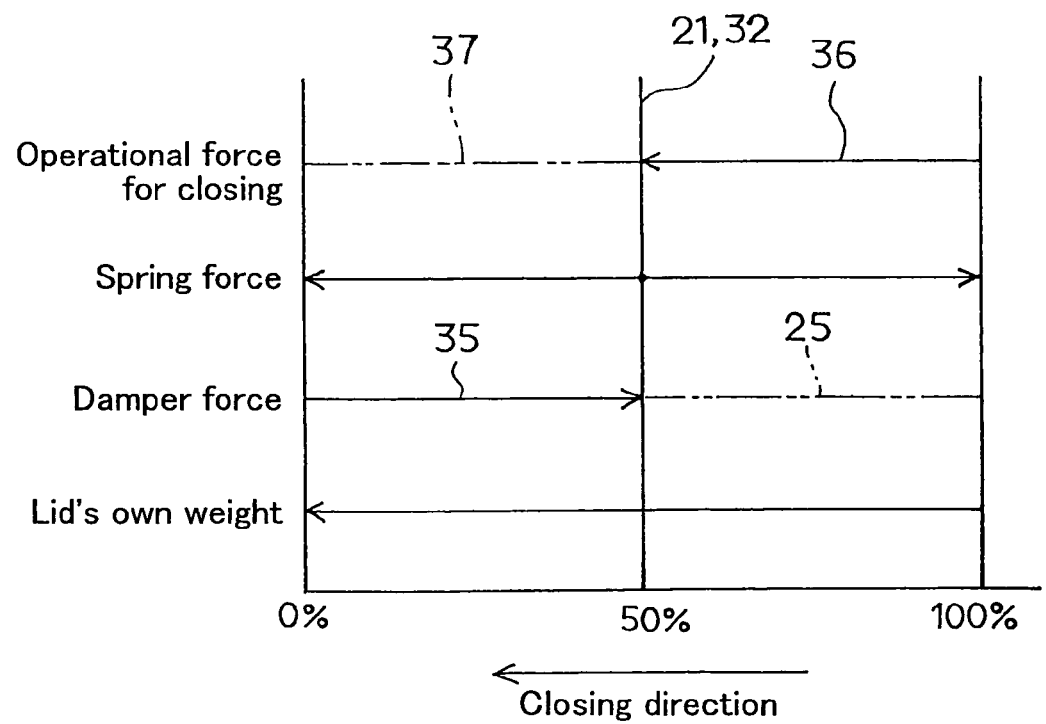
FIG. 7 is a diagram showing a relation of force at the time of closing of the lid according to the setting similar to FIG. 6.

Referring to FIGS. 6 and 7, it is preferable that the reversal point 21 be set substantially in the middle of the opening and closing of the lid 3 (a position at 50%), and be set such that the reversal point 21 and an end 31 in the opened side of the lid 3 as well as an end 32 in the closed side of the lid 3 of the free-running section 25 coincide substantially to each other.

Figure 8:
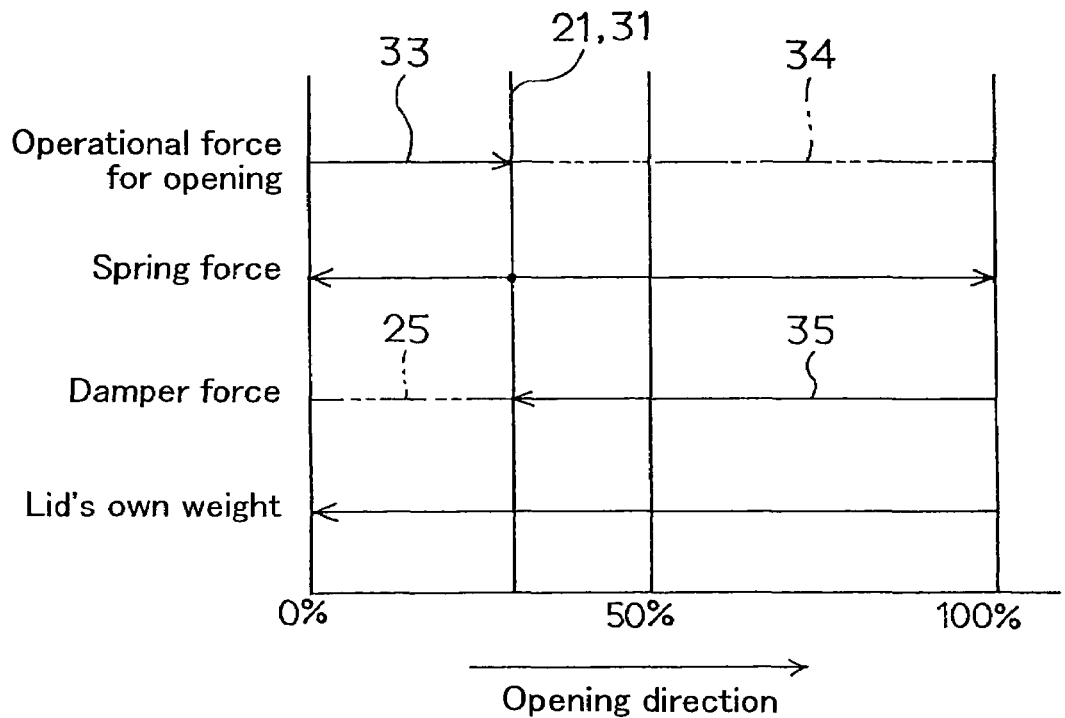
FIG. 8 is a diagram showing a relation of force at the time of opening of the lid in a case in which the reversal point of the elastic member is set in a position nearer to a closed side of the lid than the middle of the opening and closing of the lid, and in which the reversal point and the end of the free-running section are made to substantially coincide with each other.
Figure 9:
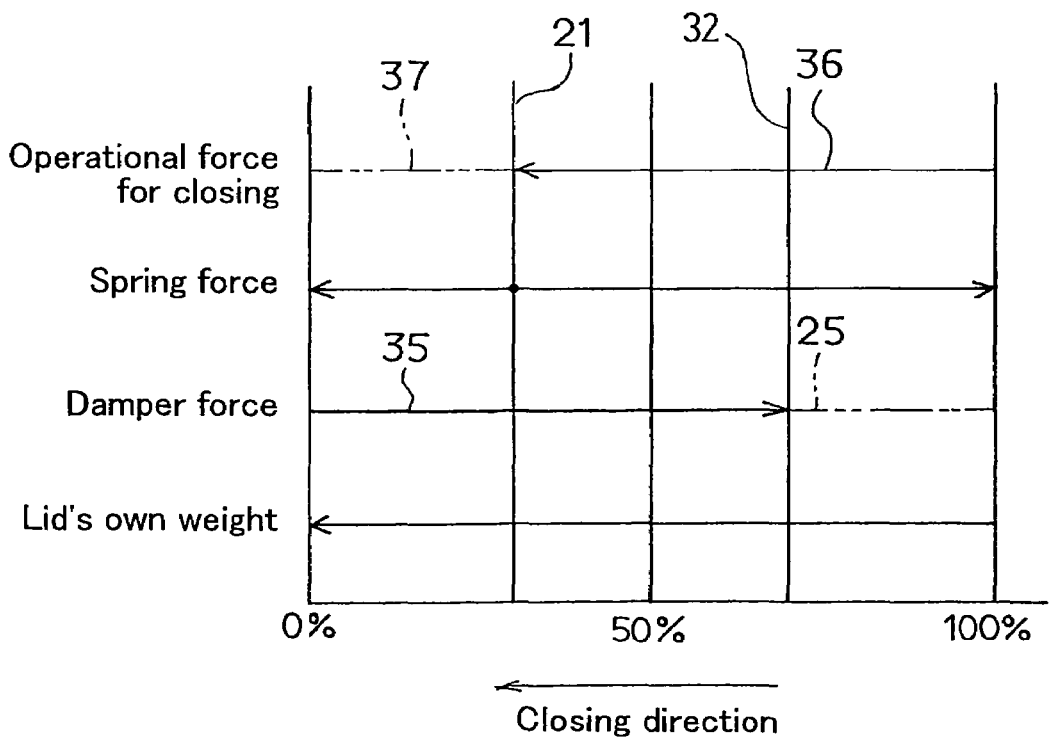
FIG. 9 is a diagram showing a relation of force at the time of closing of the lid according to the setting similar to FIG. 8.
Figure 10:
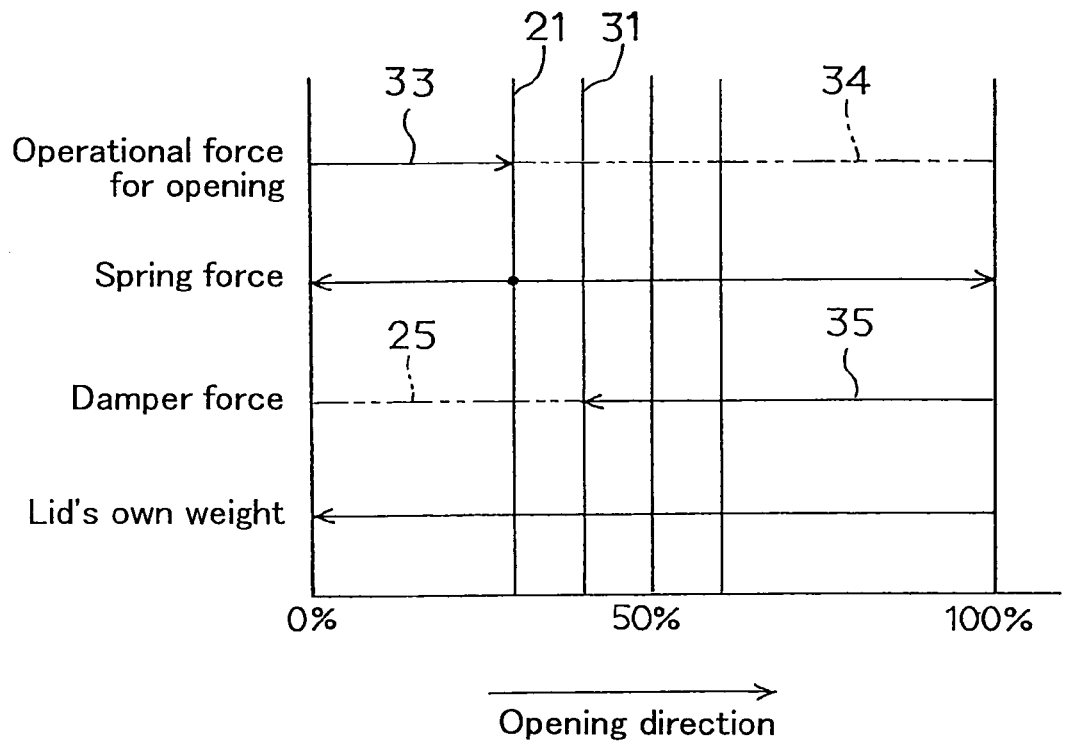
FIG. 10 is a diagram showing a relation of force at the time of opening of the lid in a case in which the reversal point of the elastic member is set in the position nearer to the closed side of the lid than the middle of the opening and closing of the lid, and in which the reversal point and the end of the free-running section are set at positions nearer to an opened side of the lid.
Figure 11:
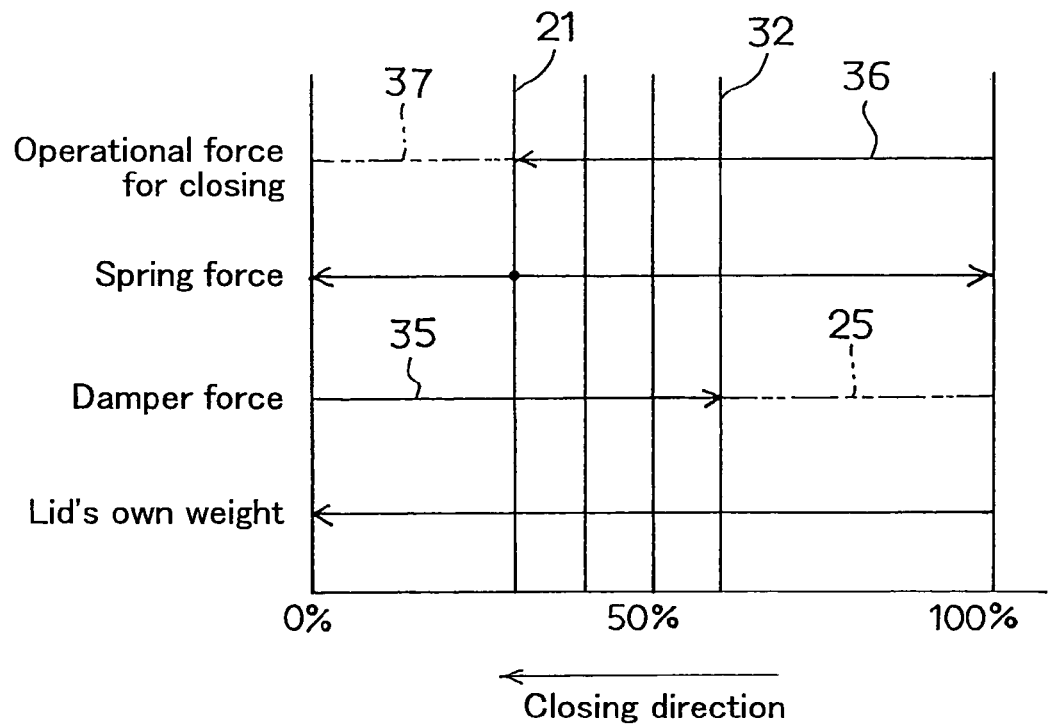
FIG. 11 is a diagram showing a relation of force at the time of closing of the lid according to the setting similar to FIG. 10.

In an alternative embodiment, as shown in FIGS. 8 to 11, the reversal point 21 is set in a position nearer to the closed side than the middle of the opening and closing of the lid 3, and the end 31 in the opened side of the free-running section 25 is set at the same position of the reversal point 21 (FIGS. 8 and 9) or set in a position nearer to the opened side than the position of the reversal point 21 (FIGs. 10 and 11). In addition, although not specifically shown in the drawings, the end 31 in the opened side and the end 32 in the closed side of the free-running section 25 can also be set substantially in the middle of the opening and closing of the lid 3 (the position at 50%).

Now, operation according to the preferred embodiment of the invention will be described hereinafter.

Taking out an object from the container device body 2, putting the object into the container device body 2 and storage of the object in the container device body 2 are attained by opening and closing of the lid 3 relative to the container device body 2. In the opening and closing of the lid 3, the elastic member 8 structuring the lid opening-closing mechanism 10 functions to bias the opening and closing of the lid 3, and the bidirectional damper 9 which also structures the lid opening-closing mechanism 10 functions to attenuate the biasing force of the elastic member 8.

More specifically, when the lid 3 is to be opened from a closed state of the lid 3, the operator lifts the lid 3 up with operational force in the opening direction against the biasing force or spring force in the closing direction of the elastic member 8 until the movement point 11 of the arm 6 reaches the reversal point 21 (manually opened section 33), as shown in FIGS. 6, 8 and 10. Accordingly, the biasing direction of the biasing force or the spring force of the elastic member 8 is reversed from the closing direction to the opening direction when the movement point 11 of the arm 6 has proceeded beyond the reversal point 21. After the movement point 11 of the arm 6 has gone beyond the reversal point 21, the lid 3 automatically opens by the biasing force of the elastic member 8 in the opening direction (automatically opened section 34). Thereby, the operational force in the opening direction throughout an entire range of opening of the lid 3 is unnecessary. Hence, it is possible to improve operational feeling of the operator. It is to be noted that, because the free-running section 25, in which the attenuating force or damper force of the bidirectional damper 9 is not generated is set in the early stage of the opening of the lid 3, it is possible to lift up the lid 3 easily with the reduced operational force of the operator in the opening direction. Also, it is possible to attenuate the biasing force of the elastic member 8 with the bidirectional damper 9 to adjust the speed of opening of the lid 3, in a damper effective section 35 provided after elapsing of the free-running section 25 in the opening of the lid 3.

On the other hand, referring to FIGS. 7, 9 and 11, when the lid 3 is to be closed from the opened state of the lid 3, the operator presses the lid 3 down with the operational force in the closing direction against the biasing force in the opening direction of the elastic member 8, until the movement point 11 of the arm 6 reaches the reversal point 21 (manually closed section 36). Accordingly, the biasing direction of the biasing force of the elastic member 8 is reversed from the opening direction to the closing direction when the movement point 11 of the arm 6 has proceeded beyond the reversal point 21, and after the movement point 11 of the arm 6 has gone beyond the reversal point 21, the lid 3 automatically closes by the biasing force of the elastic member 8 in the closing direction (automatically closed section 37). Thereby, the operational force in the closing direction throughout an entire range of closing of the lid 3 is unnecessary, and hence, it is possible to improve the operational feeling of the operator. Note that because the free-running section 25 in which the attenuating force of the bidirectional damper 9 is not generated is set in the early stage of the closing of the lid 3, it is possible to press down the lid 3 easily with the reduced operational force of the operator in the closing direction. In addition, the biasing force of the elastic member 8 and the damper force of the bidirectional damper 9 act in the damper effective section 35, provided after elapsing of the free-running section 25 in the closing of the lid 3, until the movement point 11 of the arm 6 reaches the reversal point 21, but the bidirectional damper 9 attenuates the biasing force of the elastic member 8 after the movement point 11 of the arm 6 has reached the reversal point 21, such that the adjustment of the speed of closing of the lid 3 is possible.

Accordingly, in the preferred embodiment of the invention, the reversal spring 22 and the bidirectional damper 9 are utilized, and the free-running section 25 is set. Thereby, it is possible to attain the lid opening-closing mechanism 10 which can reduce a cost, in which the operational force, operating stroke and so on are small and which has the good operational feeling of the operator. In the preferred embodiment, the free-running section 25 can be set by the angular difference or the amount of play in the directions of rotation between the notch 26 and the engagement protrusion 27, such that an equal amount of the free-running section 25 is provided in the early stage of the opening and the early stage of the closing of the lid 3, as shown in FIGS. 4 and 5.

Figure 12:
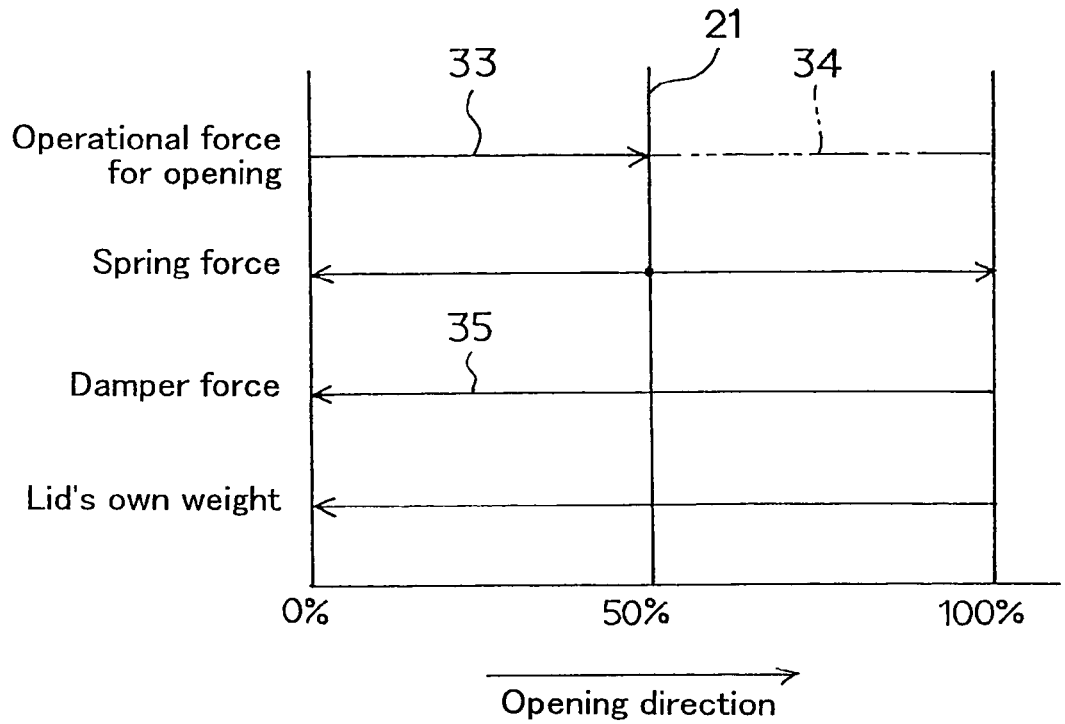
FIG. 12 is a diagram showing a relation of force at the time of opening of the lid in a case in which the reversal point of the elastic member is set substantially in the middle of opening and closing of the lid, and in which the free-running section is not set.
Figure 13:
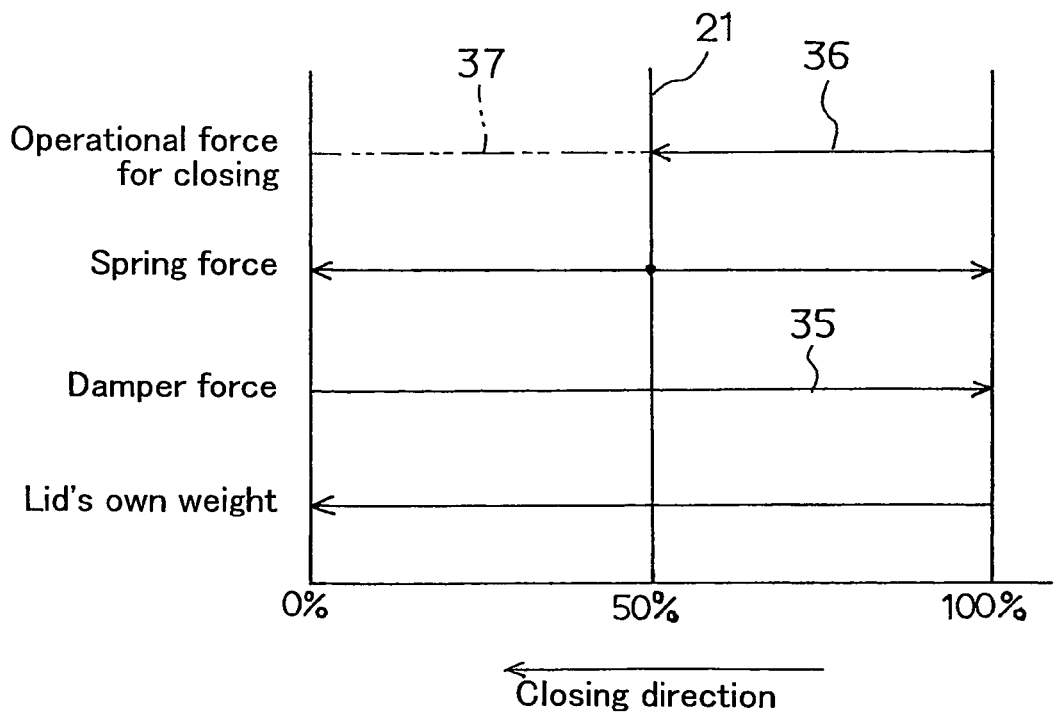
FIG. 13 is a diagram showing a relation of force at the time of closing of the lid according to the setting similar to FIG. 12.

However, referring to FIGS. 12 and 13, in a case in which the free-running section 25 is not provided, the manually opened section 33 and the manually closed section 36 are included in the damper effective section 35. Hence, the large operational force is necessary and thus the good operational feeling of the operator cannot be obtained.

According to the preferred embodiment, furthermore, the reversal point 21 of the elastic member 8 is set substantially in the middle of the opening and closing of the lid 3, and the reversal point 21 and the end 31 in the opened side of the free-running section 25 as well as the end 32 in the closed side of the free-running section 25 are set to substantially coincide to each other, as shown in FIGS. 6 and 7. As a result, the reversal point 21 of the elastic member 8 is substantially in the middle of both of the opening and closing of the lid 3, and also the manually opened section 33 as well as the manually closed section 36 and the free-running section 25 in the early stages of opening and closing of the lid 3 coincide substantially, and moreover, the automatically opened section 34 as well as the automatically closed section 37 and the damper effective section 35 coincide substantially to each other. Therefore, it is possible to make the necessary operational force small in the manually opened section 33 and in the manually closed section 36. In addition, in the automatically opened section 34 and in the automatically closed section 37, it is possible to immediately generate the attenuating force of the bidirectional damper 9.

In the alternative embodiment, as shown in FIGS. 8 to 11, the reversal point 21 of the elastic member 8 is set in the position nearer to the closed side than the middle of the opening and closing of the lid 3. Consequently, the manually opened section 33 is shortened and the automatically opened section 34 is lengthened at the time of opening of the lid 3. Hence, it is possible to make a distance of lifting up of the lid 3 (or the operating stroke) in the opening operation of the lid 3 of the operator to be short. Here, the operational force for opening of the lid 3 is increased since the empty weight of the lid 3 (lid's own weight) is added to the biasing force of the elastic member 8 at the time of opening of the lid 3. However, because the manually opened section 33 is shortened according to the alternative embodiment, it is possible to make the influence of the empty weight of the lid 3 in the opening operation of the lid 3 small, and thereby to enable the opening operation of the lid 3 by the operator easy.

Moreover, in the alternative embodiment, the end 31 in the opened side of the free-running section 25 is set at the same position of the reversal point 21 of the elastic member 8 as shown in FIGS. 8 and 9, or set in the position nearer to the opened side than the reversal point 21 of the elastic member 8 as shown in FIGS. 10 andll. Because the entire range of the manually opened section 33 is included in the free-running section 25, therefore, it is possible to make the necessary operational force small.

Also, as shown in FIG. 10, the lid 3 can be initially accelerated with the biasing force of the elastic member 8 when the free-running section 25 is continued awhile even after the reversal point 21 of the elastic member 8 is passed and the section is transited to the automatically opened section 34. Thereafter, when the attenuating force of the bidirectional damper 9 is made to effect at the most appropriate moment in which the lid 3 is accelerated and in the required opening speed, it is possible to acquire the desired opening speed of the lid 3 having stability and attractiveness.

In such a case, contrarily, the manually closed section 36 is lengthened and the automatically closed section is shortened in the closing of the lid 3. However, the operational force for closing of the lid 3 is reduced by the free-running section 25 in the early stage of the closing of the lid 3, and also the empty weight of the lid 3 can be subtracted from the biasing force of the elastic member 8 before the reversal of the elastic member 8 at the reversal point 21 in the closing of the lid 3. Thereby, the operational force for closing of the lid 3 can be further reduced, such that any influence thereof can be minimized. In addition, as shown in FIGS. 9 and 11, by adapting the movement point 11 of the arm 6 to enter into the damper effective section 35 before the movement point 11 reaches the reversal point 21, the movement point 11 of the arm 6 is prevented from entering suddenly into the automatically closed section 37, and thereby it is possible to attain the good operational feeling of the operator and a stately closing manner of the lid 3 in a middle stage of closing of the lid 3. Furthermore, by adapting the movement point 11 of the arm 6 to enter into the automatically closed section 37 after passing through the reversal point 21 of the elastic member 8, it is possible to improve the operational feeling of the operator in a later stage of closing of the lid 3.

Note that, although not specifically shown in the drawings, when the end 31 in the opened side and the end 32 in the closed side of the free-running section 25 are set substantially in the middle of the opening and closing of the lid 3 (the position at 50%), it is possible to ensure the large free-running section 25 in both of the opened side and the closed side of the free-running section 25, and also to shorten the damper effective section 35 which is before the movement point 11 reaches the reversal point 21 in the middle stage of closing of the lid 3.

The present application is based on and claims priority from Japanese Patent Application Serial No. 2005-244274, filed Aug. 25, 2005, the disclosure of which is hereby incorporated by reference herein in its entirety.

Although the present invention has been described in terms of exemplary embodiments, it is not limited thereto. It should be appreciated that variations may be made in the embodiments described by persons skilled in the art without departing from the scope of the present invention as defined by the following claims. The limitations in the claims are to be interpreted broadly based the language employed in the claims and not limited to examples described in the present specification or during the prosecution of the application, which examples are to be construed as non-exclusive. For example, in the present disclosure, the term "preferably", "preferred" or the like is non-exclusive and means "preferably", but not limited to. Moreover, no element and component in the present disclosure is intended to be dedicated to the public regardless of whether the element or component is explicitly recited in the following claims.

What is claimed is:

1. A lid opening-closing mechanism of a container device for a vehicle, comprising:
    a container device body provided in a vehicle interior of the vehicle;
    a lid attached freely openable and closable to the container device body;
    an elastic member interposed and provided between the container device body and the lid configured to bias the lid in an opening direction and a closing direction of the lid with biasing force; and
    a bidirectional damper attached to the container device body configured to attenuate the biasing force of the elastic member with attenuating force,
    wherein the elastic member includes a reversal spring in which biasing directions of the biasing force are reversible based on a reversal point in which one of the biasing directions is in the closing direction of the lid in a closed side of the lid of the reversal point and in which the other of the biasing directions is in the opening direction of the lid in an opened side of the lid of the reversal point,
    wherein the bidirectional damper includes a free-running section in which the attenuating force of the bidirectional damper is not generated in an early stage of at least one of the opening and closing of the lid, and
    wherein the reversal point of the elastic member is set in a position nearer to the closed side of the lid than a middle of the opening and closing of the lid, and wherein an end of the free-running section in the opened side of the lid is set substantially in a position the same as the position of the reversal point or is set nearer to the opened side of the lid than the position of the reversal point.

2. A lid opening-closing mechanism of the container device for a vehicle, comprising:
    a container device body provided in a vehicle interior of the vehicle;
    a lid attached freely openable and closable to the container device body;
    an elastic member interposed and provided between the container device body and the lid configured to bias the lid in an opening direction and a closing direction of the lid with biasing force; and
    a bidirectional damper attached to the container device body configured to attenuate the biasing force of the elastic member with attenuating force,
    wherein the elastic member includes a reversal spring in which biasing directions of the biasing force are reversible based on a reversal point in which one of the biasing directions is in the closing direction of the lid in a closed side of the lid of the reversal point and in which the other of the biasing directions is in the opening direction of the lid in an opened side of the lid of the reversal point,
    wherein the bidirectional damper includes a free-running section in which the attenuating force of the bidirectional damper is not generated in an early stage of at least one of the opening and closing of the lid,
    wherein the lid is supported to an open-close central shaft through an arm such that the lid is upwardly opened and downwardly closed around the open-close central shaft, and
    wherein the lid opening-closing mechanism of the container device for the vehicle further comprises:
    a sector gear mounted to the open-close central shaft and engaged with an input gear attached to an input shaft of the bidirectional damper;
    a notch provided to a shaft hole, through which the open-close central shaft is inserted and supported, of the arm; and
    an engagement protrusion provided to the sector gear which is slightly smaller than the notch,
    wherein the engagement protrusion is loosely fitted in the notch such that an angular difference between the notch and the engagement protrusion is provided as the free-running section.

* * * * *